United States Patent [19]
Buschmann

[11] Patent Number: 4,745,987
[45] Date of Patent: May 24, 1988

[54] SLIP CONTROL BRAKE SYSTEM FOR ALL WHEEL DRIVE MOTOR VEHICLES

[75] Inventor: Gunther Buschmann, Griesheim, Fed. Rep. of Germany

[73] Assignee: Alfred Teves GmbH, Frankfurt am Main, Fed. Rep. of Germany

[21] Appl. No.: 28,000

[22] Filed: Mar. 17, 1987

Related U.S. Application Data

[63] Continuation of Ser. No. 755,933, Jul. 16, 1985, abandoned.

[30] Foreign Application Priority Data

Jul. 20, 1984 [DE] Fed. Rep. of Germany ....... 3426747

[51] Int. Cl.$^4$ ............................................ B60K 17/35
[52] U.S. Cl. ............................... 180/197; 180/249; 303/96
[58] Field of Search ............... 180/197, 244, 245, 248, 180/249, 250; 192/12 R, 13 R; 303/96, 97, 105, 106, 109

[56] References Cited

U.S. PATENT DOCUMENTS

| | | | |
|---|---|---|---|
| 2,771,146 | 11/1956 | Faso | 180/248 |
| 3,138,970 | 6/1964 | Costa et al. | 74/711 |
| 3,519,314 | 7/1970 | Ballard | 180/244 X |
| 3,610,362 | 10/1971 | Toyama et al. | 180/197 |
| 3,809,956 | 5/1974 | Burkel et al. | 303/96 X |
| 4,476,953 | 10/1984 | Hiraiwa | 180/249 |
| 4,493,387 | 1/1985 | Lake et al. | 180/249 X |
| 4,504,911 | 3/1985 | Braschel et al. | 303/96 X |
| 4,549,163 | 10/1985 | Satoh et al. | 180/197 X |
| 4,589,511 | 5/1986 | Leiber | 180/244 X |

FOREIGN PATENT DOCUMENTS

| | | |
|---|---|---|
| 0106112 | 10/1982 | European Pat. Off. . |
| 1180637 | 10/1964 | Fed. Rep. of Germany . |
| 1953499 | 5/1971 | Fed. Rep. of Germany . |
| 2251548 | 4/1973 | Fed. Rep. of Germany . |

OTHER PUBLICATIONS

Firmenschrift: Bedienungsanleitung Audi 90 Quattro. S. 110–111.

*Primary Examiner*—John J. Love
*Assistant Examiner*—Charles R. Watts
*Attorney, Agent, or Firm*—James B. Raden; Robert P. Seitter

[57] ABSTRACT

A slip-controlled brake system for all-wheel drive motor vehicles is provided with differentials (16,19,20) for balancing track difference between the individual wheels (VR, VL, HR, HL). Wheel sensors (31–34) and electrical circuits (9) for generating brake pressure control signals are provided to control the brake pressure in the event of imminent locking. A disconnecting clutch (37) is inserted into a driving split axle (25) connecting a wheel to the rear axle differential (20). The disconnecting clutch (37) can be actuated either electromagnetically or hydraulically. Upon commencement of the brake slip control or at a predetermined time thereafter, the disconnecting clutch (37) is disengaged thereby rendering the coupling between the rear wheels and/or between front and rear axles ineffective thereby to permit an individual slip control by way of the individual control channels.

9 Claims, 1 Drawing Sheet

U.S. Patent May 24, 1988 4,745,987
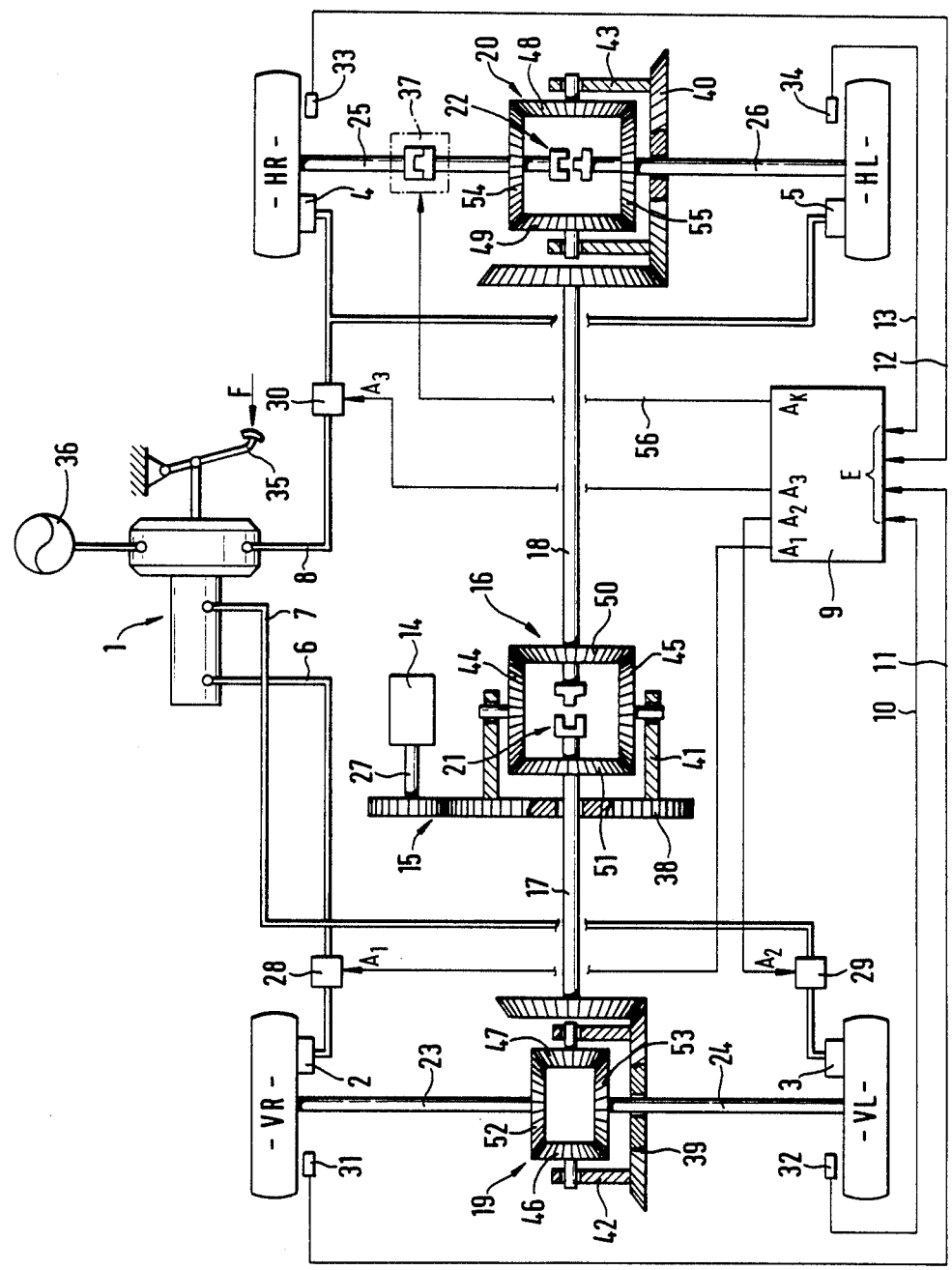

SLIP CONTROL BRAKE SYSTEM FOR ALL WHEEL DRIVE MOTOR VEHICLES

This application is a continuation of application Ser. No. 755,933, filed 7/16/85, now abandoned.

BACKGROUND OF THE INVENTION

The present invention relates to a slip-controlled brake system for all-wheel drive motor vehicles furnished with differentials for compensating position differences between the individual wheels, and comprising wheel sensors and electrical circuits for generating brake pressure control signals suitable for control of the brake pressure in the event of imminent locking.

The state-of-the-art brake slip control systems, primarily, are designed for motor vehicles having only one driven axle. In measuring the rotating characteristics, of each wheel and analyzing the measured results, specifically, in the logic operation of the measured values and in the control of th progress of the brake pressure, consideration has been given as to whether it is a driven or a non-driven wheel. Special importance is attached to the distinction between driven and non-driven wheels in the formation of the vehicle reference speed with which is compared the wheel rotating characteristics of the individual wheels. This reference speed serves as a reference figure for controlling the brake pressure progress of the individual wheels during the slip control (DE-Offenlegungsschrift No. 22 54 295).

Adaptation of the conventional brake slip control systems to all-wheel drive motor vehicles, hence, involves substantial difficulties that are further increased in the event that clutches forming differential locks are assembled into the differentials, especially into the rear axle differential and into the intermediate differential. The rigid coupling between the wheels and between the front axle and the rear axle, by way of the drive train, results in a mutual influence over all of the wheels, whereby, changes in the brake force and/or in the friction force, respectively, between tire and roadway, no longer can be detected by measuring the rotating characteristics of the individual wheels and a logical analysis of the measured values. The locked coupling, by way of the drive train, in a variety of situations results in an almost synchronous characteristics of all wheels so that it will, for example, not be possible to identify the first wheel becoming unstable or to perform a control according to the select-low principle.

In prior all-wheel drive vehicles utilizing lockable differentials it has been imperative to render inoperative the slip control when engaging the differential locks. This involves the disadvantage that, specifically, in unfavorable road or wheather conditions in which the differential locks are useful, the slip control has to be foregone, eventhough the slip control, specifically in snow and ice conditions where unbalanced friction values are present and the slip control provides special advantages which are preferable and required for maintaining the steerability and the driving stability of the vehicle.

It is, therefore, the object of the present invention to overcome the described disadvantages involved with the prior art brake slip control systems designed for all-wheel drive vehicles and to improve such brake systems to the effect that the brake slip control of the all-wheel driven vehicle can be put into operation in whatever situation and, depending on the number of control channels, said system permits an individual control of the single wheels or wheel groups.

SUMMARY OF THE INVENTION

This object is achieved by a slip controlled brake system of the described type, the unique feature of which resides in that at least in one of the split axles transferring the driving moment from a differential to a wheel of the vehicle is provided a disconnecting clutch which upon commencement of the slip control or at a predetermined moment after starting of the slip control is automatically disengageable.

In the practice of the invention, the disconnecting clutch can remain disengaged until termination of the slip control or until a predetermined time after termination of the control. Conversely, it may be of advantage in respect of special applications to permit re-engagement of the clutch only after termination of the brake operation or after termination of special control phases. The disconnecting clutch, suitable, can be of a claw-type configuration which is of a comparatively simple construction and involves low structural volume requirements.

The disconnecting clutch may be electromagnetically or hydraulically operated. In the first instance, disengagement can be can be accomplished during the first slip control phase in which a further rise in the brake pressure is avoided. In the event of a hydraulic operation, a means for fluid communication with a working chamber is particularly suitable, in which, with a conventional slip control system (De-OS No. 30 40 561), by way of a so-called master valve, hydraulic pressure is introduced into a plenum chamber. From there, the pressurized fluid is fed into the static brake circuits in order to compensate the drain of hydraulic fluid in the pressure decrease phase.

Moreover, an advantageous embodiment of the brake system of the invention resides in that the disconnecting clutch is inserted into one of the two driving split axles connecting one rear wheel to the rear axle differential. Even when locking the rear axle differential, for example, with the aid of an internal visco-type clutch, the disengagement of the disconnecting clutch inserted in the split axle in accordance with the invention permits the independent control of the rear wheels such as the select-low-type to be performed on the rear axle. Thus, the driving stability can be safeguarded because the brake pressure orients itself by the wheel having poorest road contact.

Due to the disengagement of the disconnecting clutch, in the event that the differentials are not locked, all of the wheels are in non-driven condition. With the differentials locked in whole or part, at least the disconnected vehicle wheels is individually controllable. In the event that the driving split axles of the rear axle are locked in part by means of a visco clutch, the slip in the rear axle differential will reduce accordingly the engine brake torque as transferred.

The formation of the reference vehicle speed as a reference and guide figure for determining the individual brake pressure in the individual control channels, by the separation of the drive, in the disengagement of the disconnecting clutch, will be substantially improved. The coupling of the wheels, by way of the drive train, that normally falsifies the measured values, is eliminated.

BRIEF DESCRIPTION OF THE DRAWING

Various other objects, features and attendant advantages of the invention will be more fully understood from the following description when taken in conjunction with the accompanying drawing in which the single FIGURE is a schematic diagram of the brake system in accordance with the present invention.

DETAILED DESCRIPTION

The term slip control as used herein refers to brake slip control. Brake slip control refers to wheel slip caused by actuation of the brakes and is defined as negative—i.e., wheel velocity of the wheel is less than the vehicle velocity.

The drawing is a schematically simplified view of the distribution and the path of transfer of the driving torques of an all-wheel drive motor vehicle inclusive of the arrangement of the various differentials and compensating drives. Moreover, a brake pressure generator, such as master cylinder 1, the hydraulic connecting lines 6 through 8 leading through the individual wheel brakes 2 to 5, the sensing electrical circuits 10 through 13 combined to feed data into an analyzer block 9 and some representative electrical signal lines $A_1$, $A_2$, $A_3$ . . . $A_K$ are shown, which latter signal lines will accept and communicate the analyzed wheel rotational velocity information in the general direction symbolized by arrows.

The vehicle as shown comprises a power source 14 which, via a back gear 15, transfers the driving torque to an intermediate differential 16 and from here, via driving shafts 17,18, to a front axle differential 19 and a rear axle differential 20 and, eventually, from the differentials to the front wheels VR, VL and the rear wheels HR, HL, respectively.

The intermediate differential 16 and the rear wheel differential 20, with the aid of clutches 21 and 22, respectively, are lockable in order to improve in the event of adverse conditions, the transfer of the driving torque to the road. Clutches 21 and 22 can, for example, be of either electromagnetic claw-type or hydraulic visco-type configuration. The front axle differential 19, in the form of embodiment as shown in the present instance, is not lockable because a coupling of the two driving split axles 23,24 would highly deteriorate the steerability of the vehicle.

The three differentials 16,19, 20 as shown, basically, are of identical construction except that the rear axle and the front axle differentials 19 and 20, respectively, are formed as angular drives, with drive shafts 17,18 being arranged at right angles to the split axles or drive shafts 23–26, whereas in the intermeidate differential 16, the drive shafts 17,18 extend in parallel to the axis of rotation 27 of the drive 14.

The individual differentials 16,19,20 include, as the substantial components thereof, respectively one driving wheel 38,39,40 secured to which is a housing 41,42,43. Rotatably disposed in the housings are respectively two compensating wheels 44,45; 46,47; 48,49 via which, eventually, the drive torque is transferred to the ring gears 50,51; 52,53; 54,55 connected to the drive split axles 23,24,25,26.

Pedal force indicated by an arrow can be applied to the brake pressure generator 1 by means of a brake pedal 35. For supplying auxiliary energy serving to boost the brake pedal force, a hydraulic reservoir 36 may be connected to the brake pressure generator 1 which is loaded in the usual manner by a hydraulic pump (not shown).

To determine the rotational condition of the wheels $V_L$, $V_R$, $H_L$ and $H_R$ there are provided a like number of wheel sensors 31-34. These sensors sense wheel rotational characteristics, such as wheel velocity, and are connected to and transmit data over signal lines 10-13 to the analyzer represented by the block 9. The sensor lines are connected to the inputs of the electronic circuits, with the information on the wheel rotational characteristics being fed into the circuits of block 9 to derive, by analysis and logical interpretation of the said signals, such as by comparing the actual wheel velocity to a reference velocity, brake pressure control signals for actuating a plurality of brake pressure modulators 28, 29, 30.

For controlling the brake slip, well known brake pressure modulators 28,29,30 are provided in the pressure fluid lines 6,7,8 leading to the front wheels and to the rear wheels. Such brake pressure modulators can be configured, for example, as electromagnetically operable multiple path valves which, for purposes of decreasing the brake pressure, in the wheel brakes 2,3,4,5, can switch a path (not shown) leading to a pressure equalizing tank or to a pressure passage position connected to reservoir 36. Such brake pressure modulators 28,29 and 30 are electromagnetically actuated by brake pressure control signals generated with the aid of the circuits in block 9 which are, via outputs $A_1$, $A_2$, $A_3$, in electrical communication with the brake pressure modulators 28, 29, and 30.

An example of a preferred embodiment is shown as a three-circuit brake pressure generator 1 which is connected, via hydraulically separated lines 6,7, to the two front wheels VR, VL and, via a common circuit 8, to the rear wheels HR, HL.

The clutches 21,22 locking the differentials 16,20, depending on the configuration thereof, are operable either mechanically, hydraulically, pneumatically or electromagnetically. In the normal position, as shown, clutches 21,22 are disengaged.

A—normally engaged—disconnectable clutch 37 is inserted in the driving split axle 25 of the righthand rear wheel and is important to the invention. Upon activation of the brake slip control, in the example of embodiment of this invention, an electrical signal is generated as output $A_k$, which signal, via signal line 56, causes disengagement of the disconnecting clutch 37 which, for the purpose of this example, is provided with an electromagnetic drive.

The operating connection of the separating clutch 37 to the circuits of block 9 9 which generates the brake pressure control signals for controlling any build-up of the brake pressure, involves the advantage that the separating clutch 37 immediately upon occurrence of such a signal indicative of a locking tendency, or even after a predetermined delay, optionally, under consideration of additional criteria, can be disengaged and, at a predetermined time, for example, after the locking risk having been removed or the braking operation terminated, can again be engaged.

Conversely, if a vitro-type clutch is used, the hydraulic actuation of the disconnecting clutch 37 can be accomplsihed by having the clutch connected to a chamber (not shown) in the brake pressure generator 1 in which, during normal braking operations, atmospheric pressure prevails and into which, in the event of activation of brake pressure control, pressure fluid is introduced to clutch 37 through valve control.

The disconnecting clutch 37 can be formed as either a hydraulically or electromagnetically engaged claw-type clutch that is easy to manufacture. The electrical or hydraulic corrective signals as described, can be derived from either the electrical circuits block 9 or the brake pressure generator 1, respectively, without any noteable extra efforts, because commencement of the slip control will be brought about by signal changes and circuit functions, respectively, that can also be utilized for actuating the disconnecting clutch 37.

What is claimed is:

1. A slip-controlled brake system for a wheeled motor vehicle including a plurality of axles, at least one of said axles being split, means for applying motive power to all wheels, a differential for each of said axles for compensating position differences between individual wheels of said vehicles, a plurality of wheel sensors equal in number to the number of wheels and adapted to determine a rotational velocity condition of said wheels and to develop a signal of said condition, analyzer means connected to each of said sensors for receiving said signals and to derive, by analysis and logical interpretation of said signals, at least one brake pressure control signal, a plurality of brake pressure modulators adapted to accept and be controlled by said control signal in a manner suitable to brake pressure in the event of imminent locking of a wheel brake, and further including a disconnecting clutch assembled in said at least one split axle, said analyzer means electrically coupled to said disconnecting clutch for disengaging said disconnecting clutch in response to said to least one brake pressure control signal whereby driving torque from said differential to a wheel is eliminated by said clutch upon derivation of a brake pressure control signal that is transmitted by said analyzer indicating need for slip control.

2. A slip-controlled brake system of the type claimed in claim 1 wherein said disconnecting clutch is disengaged at a predetermined time period after commencement of slip control.

3. A slip-controlled brake system of the type claimed in claim 1 wherein said disconnecting clutch remains disengaged until termination of said slip control.

4. A slip-controlled brake system of the type claimed in claim 1 wherein said disconnecting clutch remains disengaged for a predetermined time after termination of slip control.

5. A brake system according to claim 1 wherein the disconnecting clutch remains disengaged until termination of a braking operation.

6. A brake system according to claim 1 wherein the disconnecting clutch remains disengaged for a predetermined time after termination of braking operation.

7. A brake system according to claim 1 wherein there is a third differential interposed between said means for applying motive power and which transmits power to the differentials serving the front and rear axles.

8. A brake system according to claim 7 wherein at least one of said three differentials includes an internal clutch means which can be actuated to lock said one differential thereby to assist a pair of wheels being driven by said locked differential under predetermined driving conditions.

9. A brake system according to claim 8 wherein said split axle is structurally arranged in the rear axle to thereby permit greater freedom in maneuverability in front driven steering wheels of said vehicles while variable braking is applied to the rear wheels.

* * * * *